(12) United States Patent
Hsu

(10) Patent No.: US 9,388,614 B2
(45) Date of Patent: *Jul. 12, 2016

(54) PARALLELISM FIXING DEVICE APPLIED TO DUAL-SHAFT SYSTEM

(71) Applicant: FIRST DOME CORPORATION, New Taipei (TW)

(72) Inventor: An Szu Hsu, New Taipei (TW)

(73) Assignee: First Dome Corporation, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/159,580

(22) Filed: Jan. 21, 2014

(65) Prior Publication Data

US 2015/0173218 A1 Jun. 18, 2015

(30) Foreign Application Priority Data

Dec. 17, 2013 (TW) ............................. 102223785 U

(51) Int. Cl.
  *E05D 3/12* (2006.01)
  *G06F 1/16* (2006.01)

(52) U.S. Cl.
  CPC ................ *E05D 3/12* (2013.01); *G06F 1/1616* (2013.01); *G06F 1/1618* (2013.01); *G06F 1/1681* (2013.01); *Y10T 16/547* (2015.01)

(58) Field of Classification Search
  CPC ............... E05D 3/06; E05D 3/12; E05D 3/18; E05D 3/122; Y10T 16/547; Y10T 16/5474; Y10T 16/5478; Y10T 16/546; Y10T 16/544; Y10T 16/5443; Y10T 16/53864; Y10T 16/5387; Y10T 16/5398; Y10T 16/53987; Y10T 16/53988; G06F 1/1681; G06F 1/1618; G06F 1/162; G06F 1/1679
  See application file for complete search history.

(56) References Cited

U.S. PATENT DOCUMENTS

| 4,200,957 | A | * | 5/1980 | Hsu ................................ 16/314 |
| 4,242,773 | A | * | 1/1981 | Beigh ............................. 16/371 |
| 5,666,694 | A | * | 9/1997 | Slow et al. ..................... 16/368 |
| 7,414,834 | B2 | * | 8/2008 | Ukonaho et al. ......... 361/679.55 |
| 7,512,426 | B2 | * | 3/2009 | Maatta et al. .............. 455/575.1 |
| 7,738,930 | B2 | * | 6/2010 | Petrella ....................... 455/575.3 |
| 7,765,644 | B2 | * | 8/2010 | Ueyama et al. ................. 16/354 |
| 7,900,323 | B2 | * | 3/2011 | Lin ................................. 16/366 |
| 7,930,803 | B2 | * | 4/2011 | Ueyama et al. ................. 16/366 |
| 8,474,101 | B2 | * | 7/2013 | Wang et al. .................... 16/366 |
| 8,615,848 | B2 | * | 12/2013 | Mitsui ............................ 16/366 |
| 2006/0236505 | A1 | * | 10/2006 | Maatta et al. .................. 16/366 |
| 2006/0238970 | A1 | * | 10/2006 | Ukonaho et al. .............. 361/683 |
| 2007/0094846 | A1 | * | 5/2007 | Ishida ............................. 16/354 |
| 2008/0307608 | A1 | * | 12/2008 | Goto .............................. 16/366 |

(Continued)

*Primary Examiner* — Jeffrey O Brien
(74) *Attorney, Agent, or Firm* — Rosenberg, Klein & Lee

(57) ABSTRACT

A parallelism fixing device applied to dual-shaft system for fixing the parallelism of the rotary shafts and facilitating the assembling process. The parallelism fixing device includes a first rotary shaft, a second rotary shaft and a fixing unit, which are assembled with each other. Each of the first and second rotary shafts has a fixed section mounted on an electronic apparatus, a pivoted section assembled with a torque module and a middle section positioned between the fixed section and the pivoted section. The fixing unit is assembled with the middle sections. The fixing unit has a substantially 8-shaped cross section and includes a first chamber, a second chamber and a belly section in connection with the first and second chambers. The middle sections of the first and second rotary shafts are respectively fixedly assembled in the first and second chambers.

6 Claims, 3 Drawing Sheets

(56) References Cited

U.S. PATENT DOCUMENTS

| | | | |
|---|---|---|---|
| 2009/0000062 A1* | 1/2009 | Yamanami | 16/366 |
| 2009/0013500 A1* | 1/2009 | Ueyama et al. | 16/354 |
| 2011/0157780 A1* | 6/2011 | Wang et al. | 361/679.01 |
| 2011/0289726 A1* | 12/2011 | Zhang et al. | 16/250 |
| 2012/0096678 A1* | 4/2012 | Zhang et al. | 16/302 |
| 2013/0318746 A1* | 12/2013 | Kuramochi | 16/342 |

* cited by examiner

PARALLELISM FIXING DEVICE APPLIED TO DUAL-SHAFT SYSTEM

BACKGROUND OF THE INVENTION

1. Field of the Invention

The present invention relates generally to a parallelism fixing device applied to dual-shaft system, and more particularly to a parallelism fixing device, which is assembled with two rotary shafts of the dual-shaft system to help in fixing the parallelism of the rotary shafts.

2. Description of the Related Art

There are various electronic apparatuses provided with covers or display screens, such as mobile phones, notebooks, PDA, and electronic books. The covers or display screens are pivotally mounted on the electronic apparatuses via pivot pins or rotary shafts, whereby the covers or display screens can be freely rotated and opened/closed under external force.

In order to operate the display module (such as the screen) and/or the apparatus body module of the electronic apparatus in more operation modes and application ranges, a dual-shaft mechanism is provided between the display module and the apparatus body module, whereby the display module and/or the apparatus body module can be operated in different operation modes by different rotational angles.

In the above conventional pivot pin structures or one end (or so-called pivoted end) of the rotary shaft structures, generally a torque module composed of multiple gaskets with through holes and recessed/raised locating sections and multiple frictional plates is assembled on the rotary shaft. Two ends of the rotary shaft are respectively fixedly assembled in a case by means of retainer rings or retainer plates. The other end (or so-called fixed end) of the rotary shaft is mounted on the apparatus body module and display module of the electronic apparatus. When a user operates the display module of the apparatus body module to rotate the same, the rotational action force is applied to one end or fixed end of the rotary shaft to make the rotary shaft rotate. In this case, the other end or the pivoted end of the rotary shaft is likely to slightly deflect. As a result, the electronic apparatus can be hardly smoothly rotated and operated.

That is, the fixed end of the rotary shaft serves as a rotational support point of the action force for rotating the electronic apparatus. This will make the other end or the pivoted end of the rotary shaft deflected. As well known by those who are skilled in this field, in order to solve the above problem, it is necessary to assemble the retainer rings and the retainer plates at two ends of the rotary shaft with the rotary shaft and the case at high precision so as to keep the parallelism of the two rotary shafts and solve the problem of deflection of one end of the rotary shaft. Obviously, this will increase the difficulty in assembling and processing and thus increase the manufacturing cost. This is not what we expect.

The conventional pivot pin structures or rotary shaft structures and the relevant connection components thereof have some shortcomings in use and structural design that need to be overcome. It is therefore tried by the applicant to provide a parallelism fixing device applied to dual-shaft system to eliminate the shortcomings existing in the conventional rotary shaft structure so as to widen the application range. For example, in comparison with the conventional pivot pin structures or rotary shaft structures, the pivot pin or rotary shaft is assembled with the fixing device. In response to the rotation of the electronic apparatus, the fixing device can keep the parallelism of the rotary shafts and minimize the possibility of deflection of one end of the rotary shaft. Also, the fixing device can further facilitate the assembling process of the pivot pin or rotary shaft structure. Therefore, it is no more necessary to assemble the components of the rotary shaft structure at high precision.

SUMMARY OF THE INVENTION

It is therefore a primary object of the present invention to provide a parallelism fixing device applied to dual-shaft system for fixing the parallelism of the rotary shafts and facilitating the assembling process. The parallelism fixing device includes a first rotary shaft, a second rotary shaft and a fixing unit, which are assembled with each other. Each of the first and second rotary shafts has a fixed section mounted on an electronic apparatus, a pivoted section assembled with a torque module and a middle section positioned between the fixed section and the pivoted section. The fixing unit is assembled with the middle sections. The fixing unit has a substantially 8-shaped cross section and includes a first chamber, a second chamber and a belly section in connection with the first and second chambers. The middle sections of the first and second rotary shafts are respectively fixedly assembled in the first and second chambers, whereby when rotating the first and second rotary shafts, the deflection of the first and second rotary shafts is minimized to keep a good parallelism of the first and second rotary shafts.

In the above parallelism fixing device applied to dual-shaft system, the middle sections of the first and second rotary shafts are formed with drive sections and a link unit is disposed between the middle sections of the first and second rotary shafts and drivingly engaged with the drive sections for synchronously rotating the first and second rotary shafts. Corresponding to the position of the link unit, the belly section of the fixing unit defines a subsidiary chamber in communication with the first and second chambers for receiving the link unit.

The present invention can be best understood through the following description and accompanying drawings, wherein:

DETAILED DESCRIPTION OF THE PREFERRED EMBODIMENTS

Figure 1:
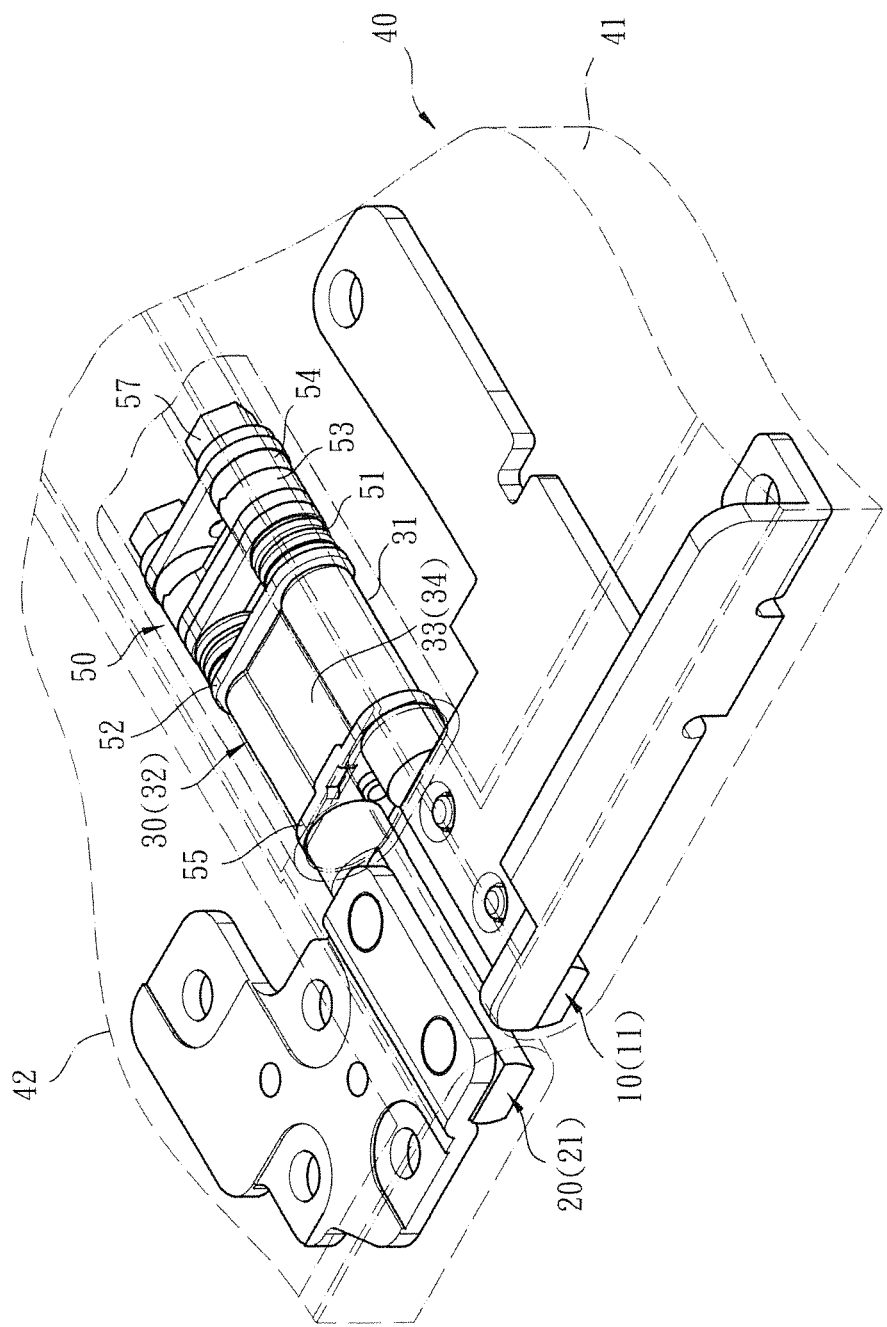
FIG. 1 is a perspective assembled view of the parallelism fixing device applied to dual-shaft system of the present invention, showing the cooperation between the first and second rotary shafts, the fixing unit and the torque module.
Figure 2:
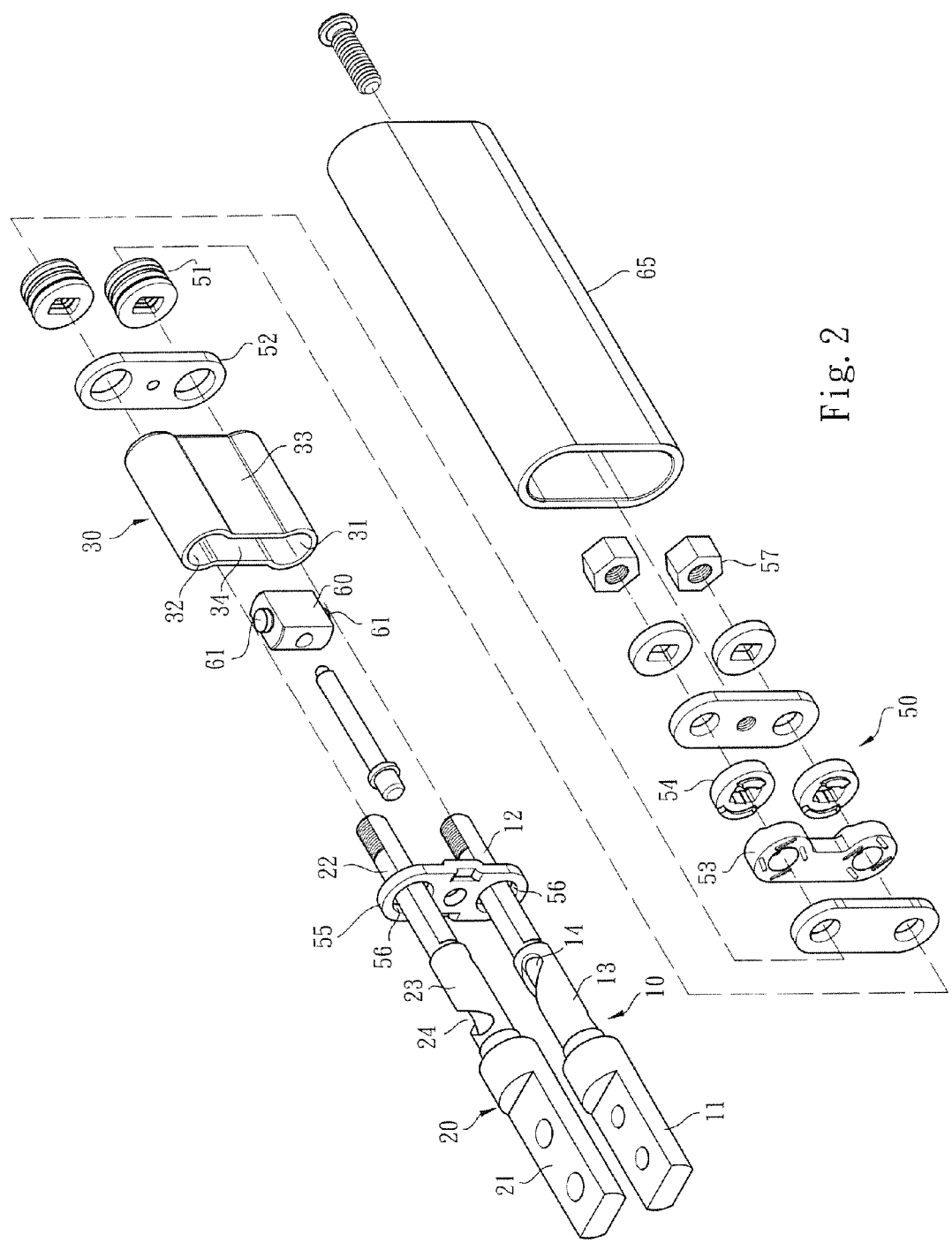
FIG. 2 is a perspective exploded view of the parallelism fixing device applied to dual-shaft system of the present invention, showing the structural form of the first and second rotary shafts, the fixing unit and the torque module.
Figure 3:
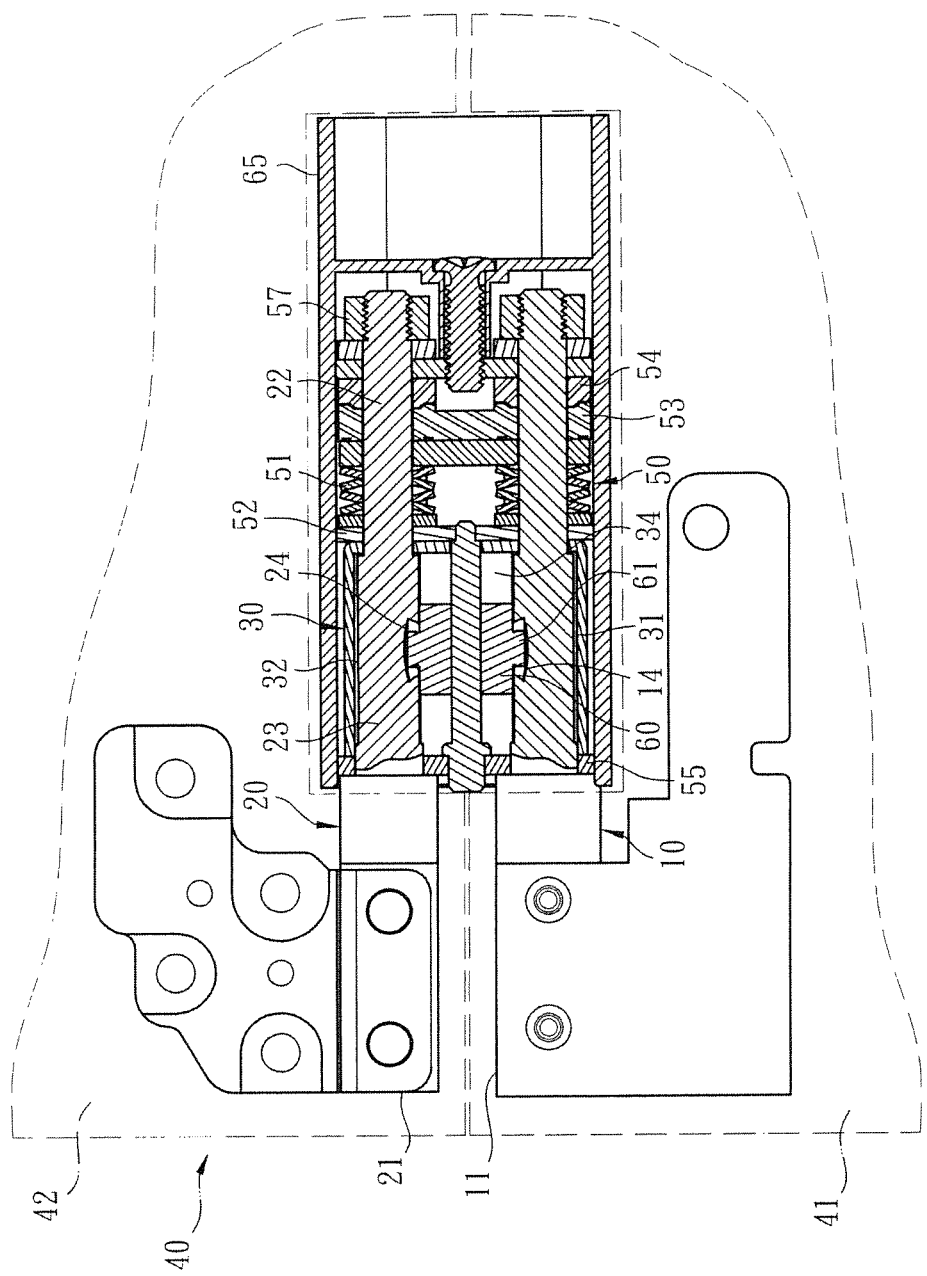
FIG. 3 is a plane sectional view of the parallelism fixing device applied to dual-shaft system of the present invention, showing that the fixing unit keeps the first and second rotary shafts having a good parallelism.

Please refer to FIGS. 1, 2 and 3. According to a preferred embodiment, the parallelism fixing device applied to dual-shaft system of the present invention is assembled with an electronic apparatus (such as a computer) for illustration purposes. The parallelism fixing device includes a first rotary shaft 10, a second rotary shaft 20 and a fixing unit 30, which are assembled with each other. Each of the first and second rotary shafts 10, 20 has a fixed section 11, 21, a pivoted section 12, 22 and a middle section 13, 23 positioned between the fixed section 11, 21 and the pivoted section 12, 22. The fixed section 11 of the first rotary shaft is connected with and disposed on an apparatus body module 41 of the electronic apparatus 40. The fixed section 21 of the second rotary shaft is connected with and disposed on a display module 42 of the electronic apparatus 40. The pivoted sections 12, 22 of the first and second rotary shafts 10, 20 are (respectively) assembled with a torque module 50. Accordingly, when the action force of a user for rotating the apparatus body module 41 or the display module 42 disappears, the first and second rotary shafts 10, 20 are immediately located.

As shown in the drawings, the torque module 50 includes multiple spring gaskets 51 (or washers), fixing plates 52, 53, rotors 54 and fixing nuts 57. These components are assembled on the first and second rotary shafts 10, 20. The fixing plate 52 or 53 and the rotors 54 are formed with cooperative recessed/raised locating sections for helping in locating the apparatus body module 41 or the display module 42.

As shown in FIGS. 1, 2 and 3, the fixing unit 30 is assembled with the middle sections 13, 23 of the first and second rotary shafts 10, 20. The fixing unit 30 is a casing structure with two open ends. The fixing unit 30 has a substantially 8-shaped cross section. The fixing unit 30 includes a first chamber 31, a second chamber 32 and a belly section 33 in connection with the first and second chambers 31, 32. The middle sections 13, 23 of the first and second rotary shafts 10, 20 are respectively fixedly assembled in the first and second chambers 31, 32.

In this embodiment, a link unit 60 is disposed between the middle sections 13, 23 of the first and second rotary shafts 10, 20 for synchronously rotating the first and second rotary shafts 10, 20. To speak more specifically, the middle sections 13, 23 of the first and second rotary shafts 10, 20 are formed with drive sections 14, 24. The drive sections 14, 24 are formed on the surfaces of the middle sections 13, 23 in the form of spiral groove. Corresponding to the drive sections 14, 24, two ends of the link unit 60 are provided with boss sections 61, which are respectively inlaid in the drive sections 14, 24. Corresponding to the position of the link unit 60, the belly section 33 of the fixing unit 30 defines a subsidiary chamber 34 in communication with the first and second chambers 31, 32 for receiving the link unit 60. When a user operates and rotates the display module 42, the second rotary shaft 20 is driven and rotated to force the link unit 60 to drive and rotate the first rotary shaft 10 and the apparatus body module 41.

As shown in the drawings, the fixing unit 30 encloses the middle sections 13, 23 of the first and second rotary shafts 10, 20 and the link unit 60. The fixing unit 30 cooperates with a restriction plate 55 and the torque module 50 and is mounted in a case 65 together with the restriction plate 55 and the torque module 50. The restriction plate 55 is formed with two perforations 56 for the pivoted sections 12, 22 of the first and second rotary shafts 10, 20 to pass through. After the pivoted sections 12, 22 of the first and second rotary shafts 10, 20 pass through the first and second chambers 31, 32 of the fixing unit 30, the pivoted sections 12, 22 are assembled with the torque module 50.

It should be noted that the fixing plates 52, 53 of the torque module 50 serve as the rotational support points of the pivoted sections 12, 22 of the first and second rotary shafts 10, 20. In addition, the middle sections 13, 23 are assembled with the fixing unit 30. Accordingly, every section of the first and second rotary shafts 10, 20 is fixed or supported. Therefore, when a user operates the display module 32 or the apparatus body module 31 to drive and rotate the fixed sections 11, 21 of the first and second rotary shafts 10, 20, the parallelism of the first and second rotary shafts 10, 20 can be kept stable.

It should be noted that FIG. 3 shows that the rotors 54 of the torque module 50 are mounted at the rear ends of the pivoted sections 12, 22 of the first and second rotary shafts. The rotors 54 are restricted between the fixing plate 53 and the fixing nuts 57. Therefore, when the recessed/raised locating sections of the rotors 54 are rotated relative to the recessed/raised locating sections of the fixing plate 53, the axial displacement of the pivoted sections 12, 22 of the first and second rotary shafts is restricted at the rear ends of the pivoted sections 12, 22 of the first and second rotary shafts. In this case, the operation gap (or axial displacement) of the entire torque module 50, which is caused by the relative rotation between the recessed/raised locating sections of the rotors 54 and the recessed/raised locating sections of the fixing plate 53 can be minimized. In contrast, in the conventional rotary shaft structure, the recessed/raised locating sections of the rotors and the recessed/raised locating sections of the fixing plate are cooperatively mounted on the middle sections of the rotary shafts. Under such circumstance, the torque module as a whole necessitates a larger movement tolerance. This will cause loosening or untightness of the rotary shaft assembly in operation/rotation of the electronic apparatus.

The parallelism fixing device applied to dual-shaft system of the present invention has the following advantages:

1. The rotary shafts and the relevant components are redesigned and different from the conventional device in use and operation form. For example, the middle sections 13, 23 of the first and second rotary shafts 10, 20 are assembled with the fixing unit 30. The fixing unit 30 has a first chamber 31, a second chamber 32 and a belly section 33 defining a subsidiary chamber 34. When the electronic apparatus 40 is operated and rotated, the parallelism of the rotary shafts can keep fixed. In practice, during the rotation of the rotary shafts, the deflection of one end of the rotary shaft is minimized.
2. The middle sections 13, 23 of the first and second rotary shafts 10, 20 can be easily assembled in the first and second chambers 31, 32 of the fixing unit 30 to form a fixing structure. Accordingly, the assembling process is simplified. Also, it is no more necessary to assemble the components of the rotary shaft structure at high precision for keeping the parallelism of the rotary shafts. Accordingly, the difficulty in assembling and processing the components is minimized and the manufacturing cost is lowered.

In conclusion, the parallelism fixing device applied to the dual-shaft system of the present invention is different from and advantageous over the conventional device.

The above embodiments are only used to illustrate the present invention, not intended to limit the scope thereof. Many modifications of the above embodiments can be made without departing from the spirit of the present invention.

What is claimed is:

1. A parallelism fixing device applied to a dual-shaft system, comprising:

first and second rotary shafts, each shaft having a fixed section mounted on an electronic apparatus, a pivoted section assembled with a torque module, and a middle section positioned between the fixed section and the pivoted section, at least one spiral groove formed on a surface of each of said first and second shafts;

a fixing unit extending in a longitudinal direction defining a casing structure with two open longitudinally opposed ends having a contour with a bulbous upper section defining a first chamber and a bulbous lower section defining a second chamber, said upper and lower sections connected by a narrowed intermediate section defining a subsidiary chamber, said first, second, and subsidiary chambers in open communication each with respect to the other, the first and second rotary shafts being assembled with the fixing unit, the middle sections of the first and second rotary shafts being respectively fixedly assembled in the first and second chambers, and a link unit being disposed between the middle sections of the first and second rotary shafts and longitudinally and slideably displaceable within said subsidiary chamber, said link unit having at least one planar engaging surface for engaging an inner planar wall of the subsidiary chamber, said link unit further having a pair of boss members protruding from ends thereof and insertably received within the spiral grooves of said first and second rotary shafts for synchronously rotating said first and second rotary shafts.

2. The parallelism fixing device applied to a dual-shaft system as claimed in claim 1, wherein the fixing unit encloses the middle sections of the first and second rotary shafts and the link unit, the fixing unit in cooperation with a restriction plate and the torque module and mounted together in a case, the restriction plate being formed with two perforations for the pivoted sections of the first and second rotary shafts to pass through, the pivoted sections of the first and second rotary shafts being assembled with the torque module after passing through the first and second chambers of the fixing unit.

3. The parallelism fixing device applied to a dual-shaft system as claimed in claim 1, wherein the torque module includes multiple spring gaskets, fixing plates, rotors, and fixing nuts, which are assembled on the first and second rotary shafts, at least one of the fixing plates and the rotors being formed with cooperative recessed/raised locating sections.

4. The parallelism fixing device applied to a dual-shaft system as claimed in claim 2, wherein the torque module includes multiple spring gaskets, fixing plates, rotors, and fixing nuts, which are assembled on the first and second rotary shafts, at least one of the fixing plates and the rotors being formed with cooperative recessed/raised locating sections.

5. The parallelism fixing device applied to a dual-shaft system as claimed in claim 3, wherein the rotors of the torque module are mounted at rear ends of the pivoted sections of the first and second rotary shafts, the rotors being restricted between the fixing plate with the recessed/raised locating sections and the fixing nuts.

6. The parallelism fixing device applied to a dual-shaft system as claimed in claim 4, wherein the rotors of the torque module are mounted at rear ends of the pivoted sections of the first and second rotary shafts, the rotors being restricted between the fixing plate with the recessed/raised locating sections and the fixing nuts.

\* \* \* \* \*